United States Patent
Drepper

(10) Patent No.: US 11,941,104 B2
(45) Date of Patent: Mar. 26, 2024

(54) UTILIZING EXTENDED FILE ATTRIBUTES FOR WORKING DIRECTORY

(71) Applicant: Red Hat, Inc., Raleigh, NC (US)

(72) Inventor: Ulrich Drepper, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 88 days.

(21) Appl. No.: 17/111,276

(22) Filed: Dec. 3, 2020

(65) Prior Publication Data
US 2022/0179939 A1    Jun. 9, 2022

(51) Int. Cl.
*G06F 21/00* (2013.01)
*G06F 21/44* (2013.01)

(52) U.S. Cl.
CPC .................. *G06F 21/44* (2013.01)

(58) Field of Classification Search
CPC ....................................... G06F 21/44
See application file for complete search history.

(56) References Cited

U.S. PATENT DOCUMENTS

| | | | | |
|---|---|---|---|---|
| 5,623,666 | A * | 4/1997 | Pike | G06F 3/0601 |
| 8,595,799 | B2 * | 11/2013 | Afek | G06F 21/6218 |
| | | | | 709/227 |
| 10,210,191 | B2 | 2/2019 | Baldwin et al. | |
| 10,552,238 | B2 * | 2/2020 | Johansson | G06F 9/543 |
| 2006/0173969 | A1 * | 8/2006 | Wilson | G06F 21/80 |
| | | | | 709/215 |
| 2009/0178035 | A1 * | 7/2009 | Alpern | H04L 67/06 |
| | | | | 703/27 |
| 2017/0169069 | A1 * | 6/2017 | Manjunath | G06F 16/2365 |
| 2017/0220400 | A1 * | 8/2017 | Degirmenci | G06F 9/546 |
| 2018/0181581 | A1 | 6/2018 | Condict | |
| 2019/0005260 | A1 * | 1/2019 | Qiu | G06F 21/6218 |
| 2019/0034634 | A1 * | 1/2019 | Hajmasan | G06F 21/55 |
| 2020/0042499 | A1 * | 2/2020 | Yamamichi | G06F 11/3072 |
| 2020/0334374 | A1 * | 10/2020 | Mandadi | G06F 16/213 |

OTHER PUBLICATIONS

Creating Attribute Types, Sun Java System Directory Server Enterprise Edition 6.0 Administration Guide, https://docs.oracle.com/cd/E19693-01/819-0995/create-attr/index.html, 2010, 2 pgs.

* cited by examiner

*Primary Examiner* — Rodman Alexander Mahmoudi
(74) *Attorney, Agent, or Firm* — Womble Bond Dickinson (US) LLP

(57) ABSTRACT

In one embodiment, a system receives an exec function invocation request from a second application to run a first application from an executable file. In response to receiving the exec function invocation request, the system determines a working directory associated with the second application. The system determines one or more extended attribute values associated with the working directory. The system determines, in view of the one or more extended attribute values, whether to allow or deny the first application to use the working directory to run the executable file of the first application.

18 Claims, 6 Drawing Sheets

UTILIZING EXTENDED FILE ATTRIBUTES FOR WORKING DIRECTORY

TECHNICAL FIELD

The present disclosure is generally related to a working directory, and more particularly, to extended file attribute for the working directory of an application process.

BACKGROUND

In computing, a working directory (or current working directory (CWD)) of an application process is a directory of a file system that is associated with each process. It is utilized by the process to create temporary or permanent files, access existing configuration files, and/or perform various other file system functions unless the specified path name is absolute. Under the Portable Operating System Interface (POSIX) standard, newly-created files and directories inherit the CWD of their parent process.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern operating systems under the Portable Operating System Interface (POSIX) standard inherit a current working directory (CWD) from the parent process. An application process that inherits a widely accessible CWD can have significant security implications. For example, if the application creates files in a CWD and the CWD is accessible by other processes and/or users, the files can be overwritten by another process or user. Although some applications change its CWD at the start, a failure to do so might not be handled correctly or may be handled too late in a program flow.

Although a directory can be restricted from being used by other users by configuring the execute permission of the directory or by other tools such as name-based security policies, which would allow/deny use of directories with certain attributes, these solutions may not be scalable. Furthermore, it may be cumbersome to configure, and may reduce the usefulness of directories with shared access.

Aspects of the present disclosure address the above-noted and other deficiencies by introducing extended file attributes that can optionally be present for each file and/or directory in a file system. In an illustrative example, an extended attribute allows a computing system to override the default CWD at process start for a given application by specifying a directory to be used as a CWD. In another illustrative example, an extended attribute specifies a directory is allowed to be used as a CWD for a given application. In another illustrative example, an extended attribute specifies a directory is not to be used as a CWD for a given application.

The extended file attributes alleviate the security concerns for the application process that inherits a widely accessible CWD because the extended file attributes can be used to specify a particular CWD for the application process without modifying the application. Furthermore, the extended file attributes can be used to allow or deny the application process from using a particular directory as the CWD.

Figure 1:
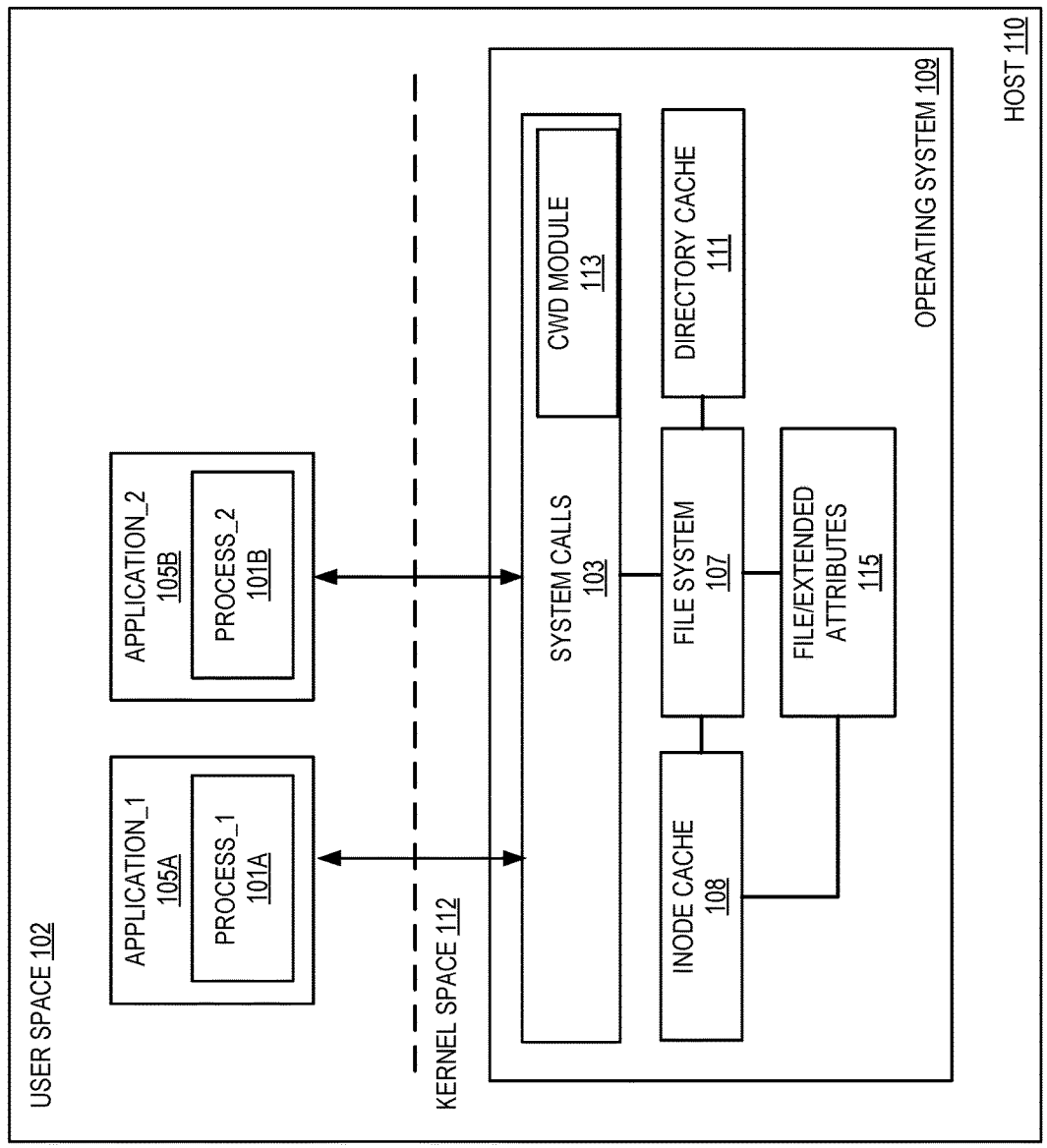
FIG. 1 depicts a block diagram of an example computing system in accordance with one or more aspects of the present disclosure.

FIG. 1 is a block diagram of one embodiment of a computing system 100 such as a client computer (e.g., a personal computer, a laptop, a PDA, a mobile phone, etc.), a server computer, a gateway computer, etc. System 100 includes physical memory (main memory), that is mapped to virtual memory, which can be divided into regions, such as user space 102 and kernel space 112. The kernel space 112 is reserved for running an operating system (OS) 109 (e.g., Linux® OS, Windows® OS, etc.). Certain privileged operations, such as input/output (I/O), file system, etc., can only be performed in the kernel mode, while the user mode is for non-privileged operations. The user space 102 is reserved for user mode applications including user applications, such as Application_1 105A and Application_2 105B. Processes 101A,B are used to execute applications 105A,B. An application 105A,B can be any type of application including, for example, a terminal application, a database management application, a browser application, a web application, a desktop application, etc. The operating system 109 acts as an interface between an application 105A,B and the hardware. Operating systems 109 are responsible for providing essential services within a computer system, such as, the initial loading of programs, file management, and protection facilities. For example, upon a bootup procedure of a computing system, an operating system 109 can execute an initialization program/process (init process) to mount file system 107.

File system 107 controls how data is stored and retrieved for computing system 100. The file system 107 has a directory cache 111. Directory cache 111 keeps, in the system memory, a directory tree that represents the directories of file system 107. The directory tree maps a path name of a file to an index node (inode) and speeds up file path name look up. Inode cache 108 keeps a table of inodes for file system 107. An inode is a data structure in a Unix-style file system that stores properties of a file or a directory. Each inode can store attributes 115 for a file or directory (file system object). Attributes 115 may include metadata, as well as owner and permission data for the file or directory. Attributes 115 may include extended attributes, which are metadata that do not have a purpose defined by a file system but are additional attributes that may or may not be specified for a file system object. In Unix-like systems, extended attributes are abbreviated as xattr and are attached via a link to the inode data structure.

System calls 103 are implemented in the kernel of OS 109. System calls 103 provide an interface for processes in user space 102 to request services from OS 109 in kernel space 112. Applications that require OS resources can use system calls as entry points to the kernel. For example, user processes, such as Process_1 101A and Process_2 101B, may request access to one or more files in file system 107 via system calls 103. Examples where system call is invoked is when an application accesses a file, a directory, or executes a process, etc.

In one embodiment, system calls 103 includes current working directory (CWD) component 113. CWD module 113 may be configured to interpret a predetermined number of extended attributes for a file or a directory of a file system 107.

Figure 2:
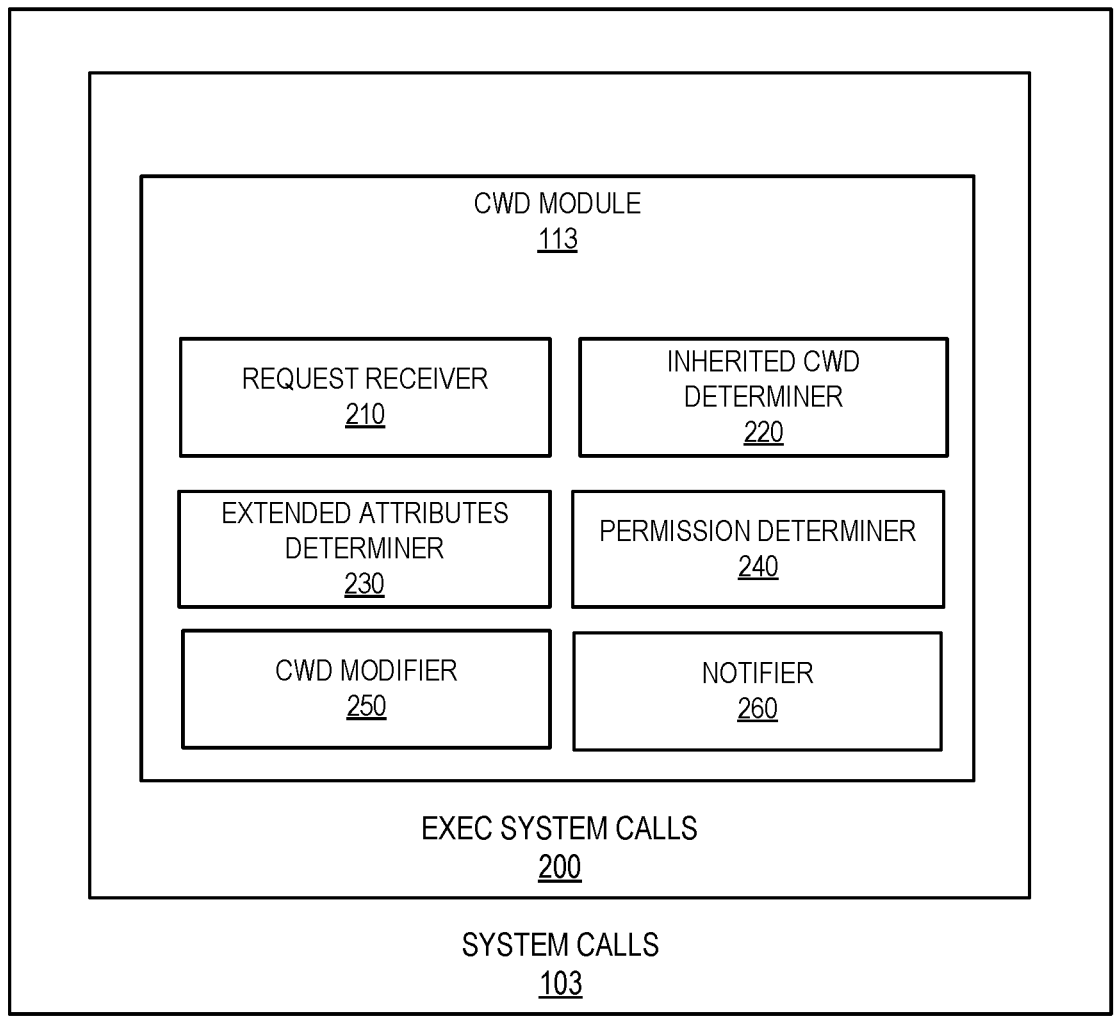
FIG. 2 depicts a block diagram illustrating an example of system calls in accordance with one or more aspects of the present disclosure.

FIG. 2 depicts a block diagram illustrating an example of system calls 103 in accordance with one or more aspects of the present disclosure. In one embodiment, CWD management module 113 is implemented as part of exec ("execute") system calls 200. Exec system calls are a subset of system calls 103 of an operating system that runs an executable file by an existing process. The exec function can be invoked by an application via a system call. The exec functions can load and execute child processes.

In one embodiment, CWD module 113 can include a number of sub-modules, such as request receiver 210, inherited CWD determiner 220, extended attributes determiner 230, access permission determiner 240, CWD modifier 250, and notifier 260. One or more of sub-modules 210-260, or a combination thereof, may be implemented by one or more software sub-modules. The sub-module designation is purely functional, i.e., one or more functional sub-modules depicted in FIG. 2 can be implemented by a single software sub-module, or a single functional sub-module can be implemented by multiple software sub-modules.

Request receiver 210 may receive an exec function invocation request via a syscall invocation by a process of a second application. Inherited CWD determiner 220 may determine a CWD of a process of a first application as inherited from the parent process (second application). Extended attributes determiner 230 may determine if there are any extended attributes for a given file system object. Permission determiner 240 may interpret the extended attributes and determine if an application process has permission to include a directory associated with the extended attribute as a CWD. CWD modifier 250 may obtain a directory path from an extended attribute and modify the CWD of an application process to be the directory path. Notifier 260 may send a notification or system event to the operating system to notify if an application is denied permission to use a directory as its CWD or notified of a change of its CWD.

Figure 3:
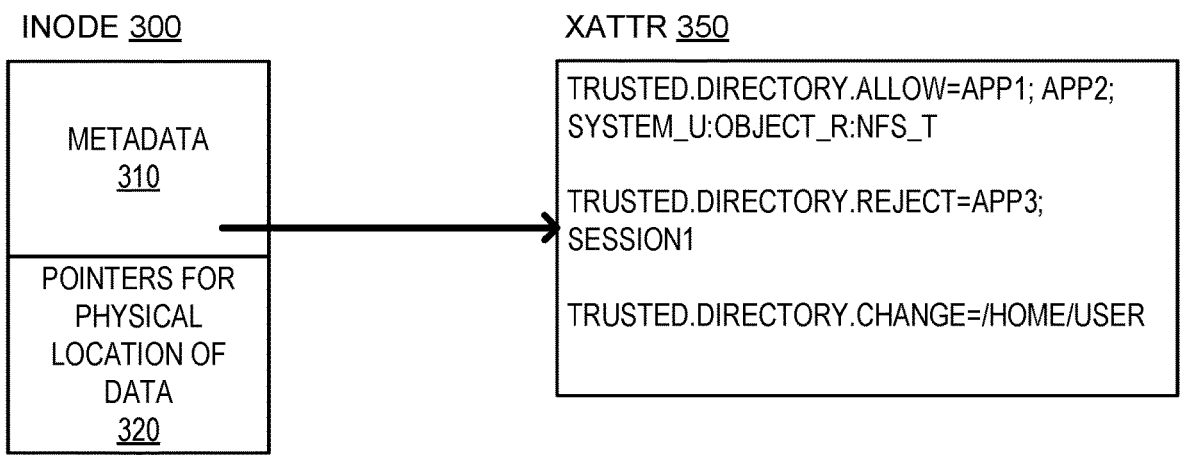
FIG. 3 depicts a diagram of an example index node (inode) data structure with one or more extended attributes in accordance with one or more aspects of the present disclosure.

System call can retrieve the extended attributes of a file system object via its inode. FIG. 3 depicts a diagram of an example index node (inode) data structure with one or more extended attributes in accordance with one or more aspects of the present disclosure. An inode is a data structure that describe properties of a file system object. Inode 300 may be used by a CWD module, such as CWD module 113 of FIG. 1, to retrieve extended attributes linked to the inode. Referring to FIG. 3, inode 300 includes metadata 310 and pointers 320, where pointers 320 point to physical locations in which the file data is stored. Metadata 310 may include a list of standard file attributes according to the POSIX standard, such as: type—file or directory, permissions—users who can read, write or execute the file, links—links to the file, owner—the owner can change many file attributes and set the permissions, group owner—the group which owns the file, file size—number of bytes of data contained in the file, and file time stamps—date and time of last modification, date and time of last access. In one embodiment, metadata 310 includes a link or pointer which points to a memory buffer storing the extended attributes 350. Extended attributes 350 may include one or more extended attributes used by a CWD module, such as CWD module 113 of FIG. 1. In one embodiment, the extended attributes may be a NULL-terminated array of one or more name-value pairs. Extended attributes for a directory type inode can include name/value pairs that specifies whether the directory is explicitly allowed, or rejected or required to be used by a particular application as the CWD. Two example extended attributes may be a working directory allow attribute and a working directory restrictive attribute, having names "trusted.directory.allow" and "trusted.directory.reject", respectively. The value for "trusted.directory.allow" may specify a list of file names, security context, session, etc. for executables which are allowed to use the directory as the CWD. The value for "trusted.directory.reject" may specify a list of file names, security context, session, etc. for executables which are not allowed to use the directory as the CWD. In one embodiment, the extended attribute values may be delimited by comma or colon.

For example, extended attribute "trusted.directory.allow=APP1; APP2; system_u:object_r:nfs_t" specifies that applications APP1 and APP2 are allowed to use the directory as the CWD. The string "system_u:object_r:nfs_t" may specify a security context for a processes or file that is allowed to use the directory as the CWD. Here, the security context may be a security mechanism used by SELinux to classify resources, such as processes and files, on a SELinux-enabled system. In SELinux, such a security context allows SELinux to enforce rules for how and by whom a given resource should be accessed. In a similar fashion, the security context can be used by a CWD module to enforce which resources are allowed to use the directory as the CWD.

In one embodiment, the security context may be defined by a string including one or more words, as illustrated by extended attributes 350. Each word specifies a different component of the security context, such as the user, role, type, and level components. Each word is separated by a colon. For this example, "system_u:object_r:nfs_t" specifies the user component to be "system_u", which refers to the default User for processes started during the boot up process. "nfs_t" refers to the type component (e.g., NFS file system), and "object_r" refers to the role component. This security context allows a CWD module, such as CWD module 113 of FIG. 1, to determine which particular processes are associated with the extended attribute. In the example of "trusted.directory.allow=APP1; APP2; system_u:object_r: nfs_t", processes running as user "system_u", role "object_r", and type "nfs_t" can use the directory as the CWD. For another illustrative example, an extended attribute for the "/tmp" directory may have "trusted.directory.allow=null", which may specify that no applications should use the "/tmp" directory as the CWD.

In one embodiment, extended attributes 350 may include a working directory restriction attribute. Working directory restriction attribute may be a name-value pair that associates one or more applications with the working directory restriction attribute. The working directory restriction attribute prevents an application that is specified by the value component of the name-value pair from using the directory as the CWD. An example of a working directory restriction attribute may be "trusted.directory.reject=APP3; SESSION1" which specifies application APP3 is explicitly not allowed to use the directory as the CWD. Furthermore, processes corresponding to the session "SESSION1" is not allowed to use the directory as the CWD. Here, every process on a system may be associated with a session-id which defines the session a process belongs to. A session refers to a group of processes running under the control of a single user. A session may refer to a user session or a terminal/shell session in linux.

In another embodiment, an extended attribute for a file type inode can include "trusted.directory.change" that specifies a name of a directory that is used as the CWD for the executable file. For example, the extended attribute "trusted.directory.change=/HOME/USER" for an executable file configures the CWD for the process running the executable file to be "/HOME/USER". Here, the application has a default, possibly immutable, CWD specified by the extended attribute "trusted.directory.change". This is desirable in some scenarios if a security policy requires the application to unconditionally use a particular CWD. Note that the above naming convention and values illustrated in the extended attributes are shown only for purposes of illustration and the names and/or values should not be construed as limiting.

Figure 4:
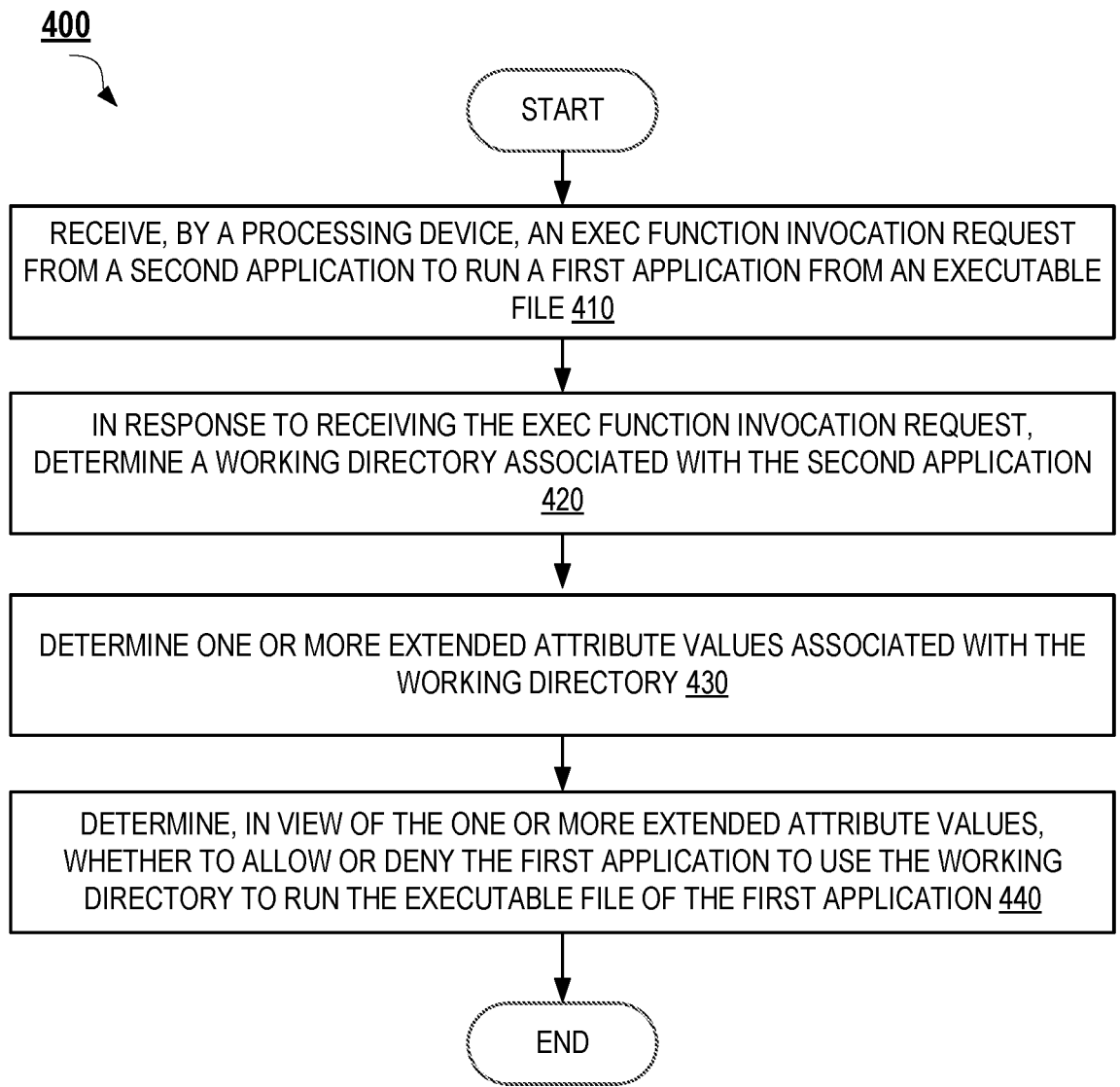
FIG. 4 depicts a flow diagram illustrating an example method to specify access permission for a directory in accordance with one or more aspects of the present disclosure.

FIG. 4 depicts a flow diagram illustrating an example method to specify access permission for a directory in accordance with one or more aspects of the present disclosure. Method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by CWD module 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 410, processing logic receives an exec function invocation from a second application. In one embodiment, the second application may be a user application in a user space. The exec function invocation request may be a request to run an executable file for a first application of the computing system. When a process of a second application submits the exec function invocation request or invokes the exec kernel function, the exec function loads the executable file into memory and prepares to execute the contained code in the executable file of the first application.

At operation 420, in response to receiving the exec function invocation request, processing logic identifies the working directory (CWD) associated with the second application. Under the POSIX standard, a process of the first application inherits a CWD from the parent process (second application) that initiated the first application. For example, if a first application is executed under a terminal (second application) from the "/home/user" directory, the first application inherits the "/home/user" directory as the CWD from the terminal (second application).

At operation 430, processing logic determines one or more extended attribute values associated with the working directory. Processing logic can traverse a directory tree of a directory cache using the working directory to determine an inode identifier mapped to the working directory. Processing logic retrieves the inode identifier for the working directory, and retrieves, from an inode cache, an inode data structure for the inode value. From the inode data structure, processing logic retrieves the extended attribute values, if any, for the CWD. In there are no extended attribute values, processing logic exits and the first application can access the working directory as the CWD if the normal permissions allow it. If there are extended attribute values, processing logic evaluates whether the first application can access the working directory as the CWD.

At operation 440, processing logic analyzes the one or more extended attribute values to determine whether to allow or deny the first application to use the working directory to run the executable file of the first application. If there are extended attribute values, processing logic retrieves the name-value pairs for the names: "trusted.directory.allow" and "trusted.directory.reject". In one embodiment, if the first application is listed, or the first application belongs to a security context or session listed, in the value for "trusted.directory.allow," the first application is explicitly granted permission to use the directory as its CWD. In this case, a process of the first application can use the working directory (CWD) to run the executable file.

In another embodiment, if the first application is listed, or the first application belongs to a security context or session listed, in the value for "trusted.directory.reject," the first application is explicitly denied permission to use the directory as its CWD. In some embodiments, if there is a conflict, e.g., both extended attributes list the first application by name, the first application is denied permission to use the directory as its CWD. If the first application is denied permission to use the directory as its CWD, processing logic may notify a user of the OS, via a system event or some other form of prompts, of the denial. In some cases, the executable file execution terminates.

In another embodiment, processing logic receives a chdir function invocation from an application. In response to receiving the chdir function invocation request, processing logic identifies a directory specified in an parameter of the chdir function invocation request. The parameter is an argument provided to the chdir function, the argument may be a directory path. Processing logic may use the directory cache to identify the directory from the directory path.

Processing logic determines one or more extended attribute values associated with the directory. E.g., "trusted.directory.allow" and "trusted.directory.reject". Processing logic may identify an inode from the inode cache for the directory. The extended attribute values are retrieved from the inode. Processing logic determines, in view of the one or more extended attribute values, whether to allow or deny the application to use the directory as its working directory. If the application, or a context associated with the application, is specified in the extended attribute values "trusted.directory.allow", the application is allowed to use the directory as its working directory. If the application, or a context associated with the application, is specified in the extended attribute values "trusted.directory.reject", the application is denied to use the directory as its working directory.

Figure 5:
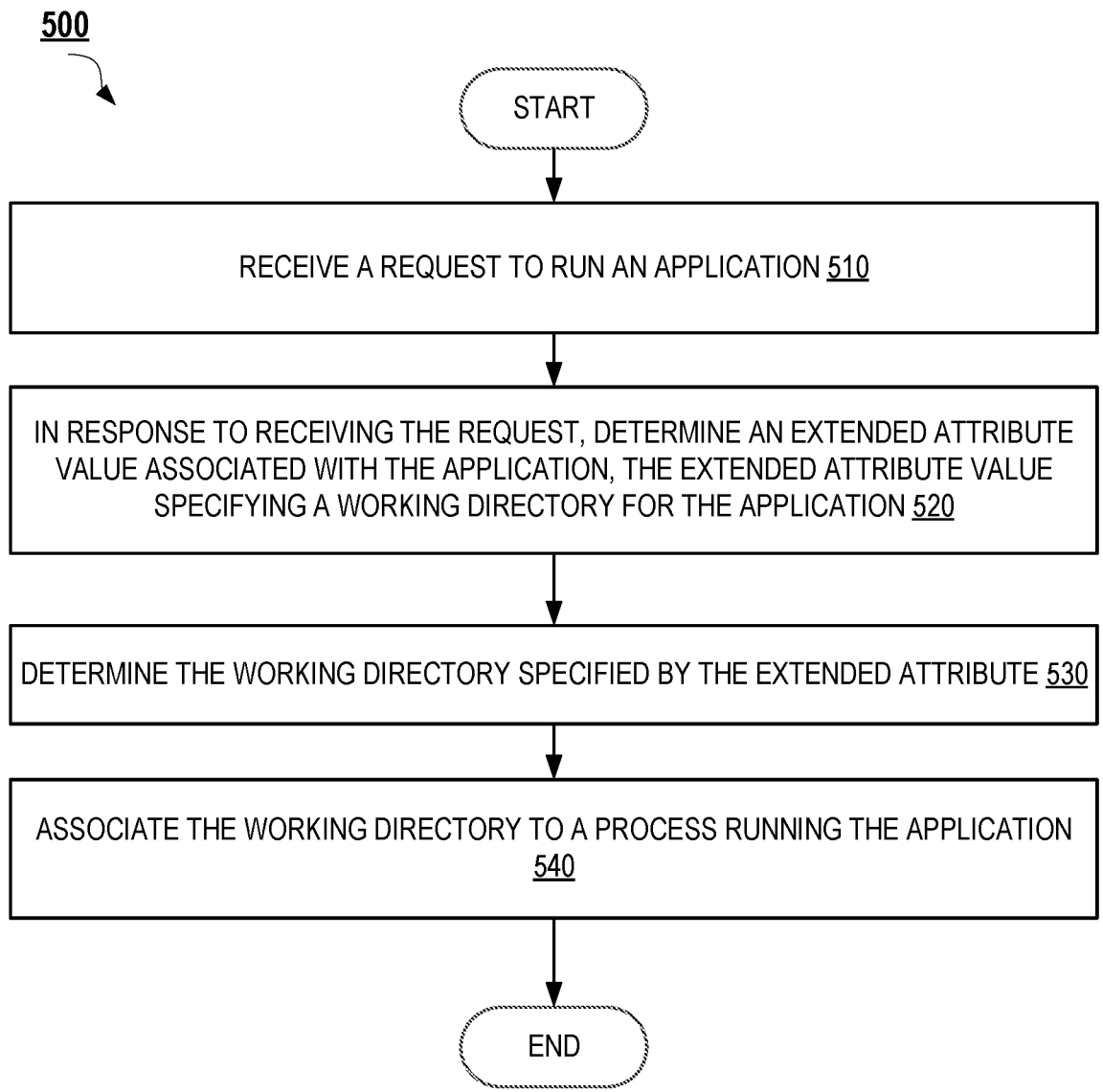
FIG. 5 depicts a flow diagram illustrating an example method to specify a working directory for an application in accordance with one or more aspects of the present disclosure.

FIG. 5 depicts a flow diagram illustrating an example method to specify a working directory for an application in accordance with one or more aspects of the present disclosure. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by CWD module 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 510, processing logic receives a request to run an application. In one embodiment, the application may be a user application in a user space. Processing logic requests a service from the kernel of the OS to initiates a process for the application. The service request is through a system call.

At operation 520, in response to receiving the request, processing logic determines an extended attribute value associated with an executable file of the application, the extended attribute value specifying a working directory for the executable file. Here, when processing the system call, processing logic can retrieve the inode associated with the executable file. From the Mode, processing logic can retrieve the extended attribute values for the inode, if any. In there are no extended attribute values, processing logic exits and the application can use a default inherited CWD as the CWD for the process. If there are extended attribute values, processing logic can evaluate whether a particular extended attribute value specifies a change of CWD for the application, e.g., an extended attribute with the name "trusted.directory.change".

At operation 530, processing logic determines the working directory (CWD) specified by the extended attribute with the name: "trusted.directory.change". In one embodiment, the value associated with such an extended attribute value is a reference to a working directory specified by the extended attribute.

At operation 540, processing logic associates the working directory with the process. During the system call to initiate the application, the CWD is updated to a reference of the directory provided by the "trusted.directory.change" extended attribute value. In one embodiment, processing logic may notify a user of the OS, via a system event, that the CWD for the application is configured to inherit from such an extended attribute, different from the POSIX standard.

In another embodiment, processing logic may further validate if the directory path specified by "trusted.directory.change" does not conflict with a "trusted.directory.reject" or "trusted.directory.allow" extended attribute of the directory. For example, processing logic may determine an inode for the directory path. Processing logic may retrieve any "trusted.directory.reject" or "trusted.directory.allow" extended attributes for the inode. If the application, or a security context or a session associated with the application is listed under "trusted.directory.reject", the application is denied permission to use the directory path as its CWD. In one embodiment, if "trusted.directory.allow=null", the application is denied permission to use the directory path as its CWD. In cases where the application is denied from using the directory as the CWD, the application can be terminated. If the application, or a security context or a session associated with the application is listed under "trusted.directory.allow", the application is allowed permission to use the directory path as its CWD.

Figure 6:
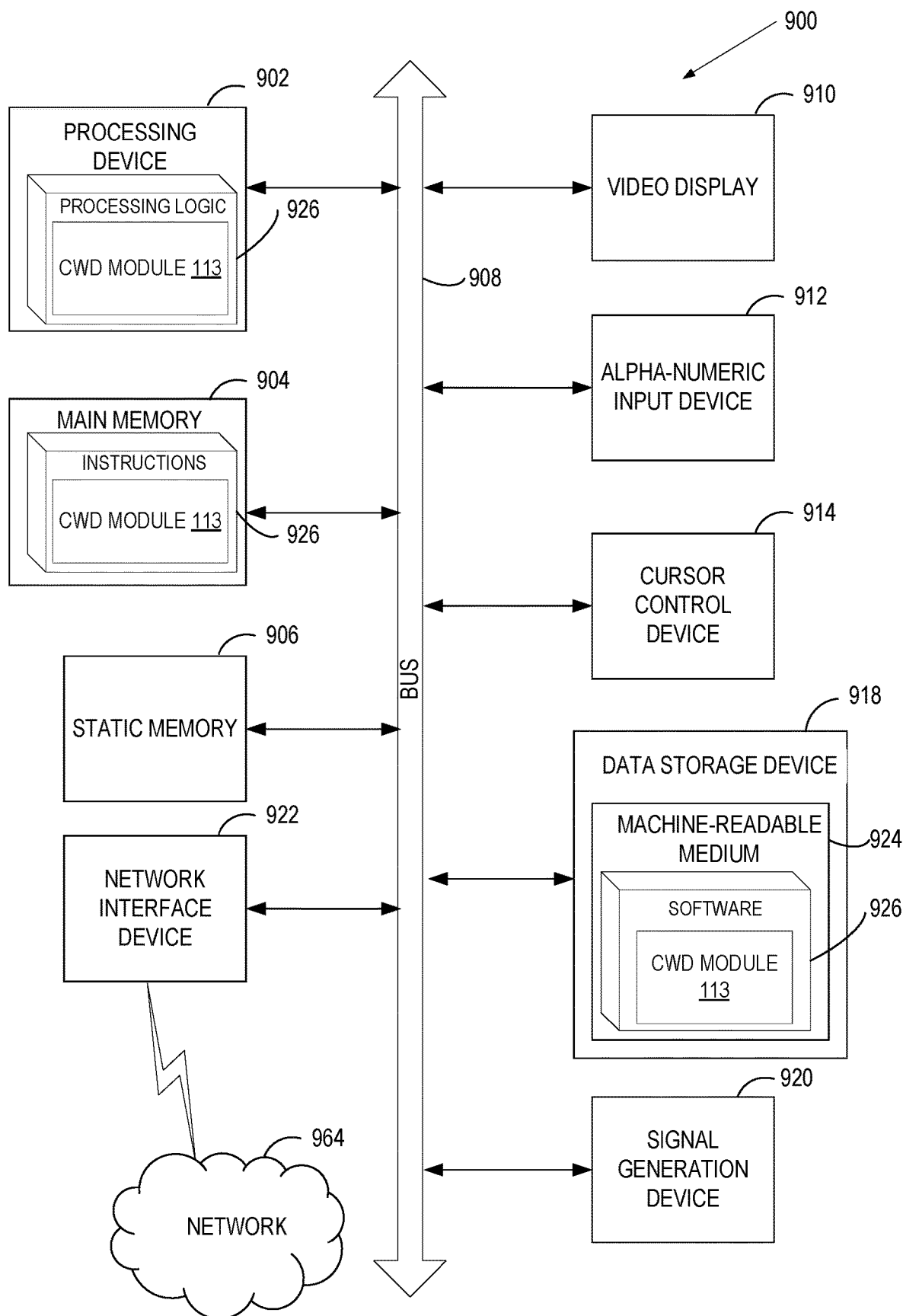
FIG. 6 depicts a block diagram of an illustrative computing device operating in accordance with the examples of the present disclosure.

FIG. 6 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to schedule computing tasks, such as CWD module 113 as described with respect to FIGS. 1 and 2, and/or a software library containing methods in FIGS. 4-5. While the machine-accessible storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Other computer system designs and configurations may also be suitable to implement the system and methods described herein. The following examples illustrate various implementations in accordance with one or more aspects of the present disclosure.

Example 1 is a method comprising: receiving, by a processing device, an exec function invocation request from a second application to run a first application from an executable file; in response to receiving the exec function invocation request, determining a working directory associated with the second application; determining one or more extended attribute values associated with the working directory; and determining, in view of the one or more extended attribute values, whether to allow or deny the first application to use the working directory to run the executable file of the first application.

Example 2 is a method of example 1, further comprising: responsive to allowing the first application to use the working directory to run the executable file, inheriting the working directory by a process running the executable file.

Example 3 is a method of example 1, further comprising, responsive to denying the first application to use the working directory, notifying a user of the denial.

Example 4 is a method of example 1, wherein the exec function invocation request is a system call request for a service from a kernel of an operating system.

Example 5 is a method of example 1, wherein determining one or more extended attribute values associated with the working directory comprises determining the one or more extended attribute values in a kernel space, wherein the second application is executed in a user space.

Example 6 is a method of example 1, wherein one of the one or more extended attribute values indicates that the first application has a permission to use the working directory.

Example 7 is a method of example 1, wherein one of the one or more extended attribute values indicates that the first application is denied a permission to use the working directory.

Example 8 is a method of example 1, wherein the one or more extended attribute values include a security context that indicates a user, a role, or a type.

Example 9 is a system comprising: a memory; and a processing device, coupled to the memory, the processing device to: receive a request to run an application; in response to receiving the request, determine an extended attribute value associated with the application, the extended attribute value specifying a working directory for the application; determine the working directory specified by the extended attribute value; and associate the working directory with a process running the application.

Example 10 is a system of example 9, wherein associating the working directory with a process running the application further comprises: determining another extended attribute value associated with the working directory; determining, in view of the another extended attribute value, whether to allow the application to use the working directory; and responsive to determining that the application is allowed to use the working directory, running the application with a context of the working directory.

Example 11 is a system of example 9, wherein the extended attribute value is associated with an index node of the executable file of the application, wherein the extended attribute value includes a directory path for the working directory.

Example 12 is a system of example 9, wherein determining an extended attribute value associated with an executable file of the application comprises determining the extended attribute value in a kernel space after a system call is invoked, wherein the application is to be executed in a user space.

Example 13 is a non-transitory machine-readable storage medium including instructions that, when executed by a processing device, cause the processing device to: receive, by a processing device, an chdir function invocation request from an application; in response to receiving the chdir function invocation request, determine a directory from a parameter of the chdir function invocation request; determine one or more extended attribute values associated with the directory; and determine, in view of the one or more extended attribute values, whether to allow or deny the application to use the directory as a working directory.

Example 14 is a non-transitory machine-readable storage medium of example 13, including instructions that, when executed by a processing device, cause the processing device to further: responsive to allowing the application to use the directory as a working directory, setting the working directory of a processing running the application to be the directory.

Example 15 is a non-transitory machine-readable storage medium of claim 13, including instructions that, when executed by a processing device, cause the processing device to further: responsive to denying the application to use the directory as a working directory, notifying a user of the denial.

Example 16 is a non-transitory machine-readable storage medium of example 13, wherein the chdir function invocation request is a system call request for a kernel of an operating system.

Example 17 is a non-transitory machine-readable storage medium of example 13, wherein determining one or more extended attribute values associated with the directory comprises determining the one or more extended attribute values in a kernel space, wherein the application is executed in a user space.

Example 18 is a non-transitory machine-readable storage medium of example 13, wherein one of the one or more extended attribute values indicates that the application has a permission to use the directory as the working directory.

Example 19 is a non-transitory machine-readable storage medium of example 13, wherein one of the one or more extended attribute values indicates that the application is denied a permission to use the directory as the working directory.

Example 20 is a non-transitory machine-readable storage medium of example 13, wherein the one or more extended attribute values include a security context that indicates a user, a role, or a type.

Example 21 is a system, comprising: a memory; and a processing device, coupled to the memory, the processing device to: receive, by a processing device, an exec function invocation request from a second application to run a first application from an executable file; in response to receiving the exec function invocation request, determine a working directory associated with the second application; determine one or more extended attribute values associated with the working directory; and determine, in view of the one or more extended attribute values, whether to allow or deny the first application to use the working directory to run the executable file of the first application.

Example 22 is a system of example 21, wherein the processing device is further to: responsive to allowing the first application to use the working directory to run the executable file, inheriting the working directory by a process running the executable file.

Example 23 is a system of example 21, wherein the processing device is further to, responsive to denying the first application to use the working directory, notifying a user of the denial.

Example 24 is a system of example 21, wherein the exec function invocation request is a system call request for a service from a kernel of an operating system.

Example 25 is a system of example 21, wherein determining one or more extended attribute values associated with the working directory comprises determining the one or more extended attribute values in a kernel space, wherein the second application is executed in a user space.

Example 26 is a system of example 21, wherein one of the one or more extended attribute values indicates that the first application has a permission to use the working directory.

Example 27 is a system of example 21, wherein one of the one or more extended attribute values indicates that the first application is denied a permission to use the working directory.

Example 28 is a system of example 21, wherein the one or more extended attribute values include a security context that indicates a user, a role, or a type.

Example 29 is a non-transitory machine-readable storage medium including instructions that, when executed by a processing device, cause the processing device to: receive a request to run an application; in response to receiving the request, determine an extended attribute value associated with the application, the extended attribute value specifying a working directory for the application; determine the working directory specified by the extended attribute value; and associate the working directory with a process running the application.

Example 30 is a non-transitory machine-readable storage medium of example 29, wherein associating the working directory with a process running the application further comprises: determining another extended attribute value associated with the working directory; determining, in view of the another extended attribute value, whether to allow the application to use the working directory; and responsive to determining that the application is allowed to use the working directory, running the application using the working directory.

Example 31 is an apparatus comprising: a processing device and a means for receiving an exec function invocation request from a second application to run a first application from an executable file; in response to receiving the exec function invocation request, a means for determining a working directory associated with the second application; a means for determining one or more extended attribute values associated with the working directory; and a means for determining, in view of the one or more extended attribute values, whether to allow or deny the first application to use the working directory as a context to run the executable file of the first application.

Example 32 includes the apparatus of example 31, further comprising: responsive to allowing the first application to use the working directory to run the executable file, loading the executable file into a memory, inheriting the working directory by a process running the executable file.

Example 33 includes the apparatus of example 31, further comprising: responsive to denying the first application to use the working directory, a means for notifying a user of the denial.

Example 34 includes the apparatus of example 31, wherein the exec function invocation request is a system call request for a service from a kernel of an operating system.

Example 35 includes the apparatus of example 31, wherein determining one or more extended attribute values associated with the working directory comprises determining the one or more extended attribute values in a kernel space, wherein the second application is executed in a user space.

Example 36 includes the apparatus of example 31, wherein one of the one or more extended attribute values indicates that the first application has a permission to use the working directory.

Example 37 includes the apparatus of example 31, wherein one of the one or more extended attribute values indicates that the first application is denied a permission to use the working directory.

Example 38 includes the apparatus of example 31, wherein the one or more extended attribute values include a security context that indicates a user, a role, or a type.

Example 39 is an apparatus comprising: a processing device and a means for receiving a request to run an application; in response to receiving the request, a means for determining an extended attribute value associated with the application; a means for determining a working directory specified by the extended attribute value; and a means for associating the working directory with a processing running the application.

Example 40 is an apparatus comprising: a processing device and a means for receiving an chdir function invocation request from an application; in response to receiving the chdir function invocation request, a means for determining a directory from a parameter of the chdir function invocation request; a means for determining one or more extended attribute values associated with the directory; and a means for determining, in view of the one or more extended attribute values, whether to allow or deny the application to use the directory as a working directory.

The methods, components, and features described herein may be implemented by discrete hardware components or may be integrated in the functionality of other hardware components such as ASICs, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    receiving, by a processing device, an execute function invocation request from a second application to run an executable file of a first application, wherein the second application is a parent process and the first application is a child process executed under the parent process, and wherein the second application is executed in a user space;
    in response to receiving the execute function invocation request, determining a shared working directory shared by the second application and the first application, wherein the shared working directory is a directory of a file system used by processes of the second application and the first application;
    identifying, in a kernel space, an extended attribute value associated with the shared working directory, wherein the extended attribute value comprises a first session identifier identifying a session comprising one or more processes; and
    determining, by comparing the first session identifier to a second session identifier associated with the first application, whether the first application has permission to use the shared working directory.

2. The method of claim 1, further comprising: responsive to determining that the first application has permission to use the shared working directory, inheriting the shared working directory by a process running the executable file.

3. The method of claim 1, further comprising, responsive to determining that the first application does not have permission to use the shared working directory, notifying a user that the first application does not have permission to use the shared working directory.

4. The method of claim 1, wherein the execute function invocation request is a system call request for a service from a kernel of an operating system.

5. The method of claim 1, wherein the extended attribute value indicates that the first application has a permission to use the shared working directory.

6. The method of claim 1, wherein the extended attribute value indicates that the first application is denied a permission to use the shared working directory.

7. The method of claim 1, wherein:
    the extended attribute value comprises one or more extended attribute values; and
    the one or more extended attribute values further include a security context that indicates a user, a role, or a type.

8. A system, comprising:
    a memory; and
    a processing device, coupled to the memory, the processing device to:
        receive a request to run an executable file of an application, wherein the application is executed in a user space;
        in response to receiving the request, determine a first extended attribute value associated with the executable file of the application;
        determine a shared working directory specified by the first extended attribute value, wherein the shared working directory is a directory of a file system shared by the application and a parent application of the application;
        determine, in a kernel space, a second extended attribute value associated with the shared working directory;
        determine whether the first extended attribute value conflicts with the second extended attribute value; and
        responsive to the first extended attribute value not conflicting with the second extended attribute value, associate the shared working directory with a process running the application.

9. The system of claim 8, wherein associating the shared working directory with the process running the application further comprises running the application.

10. The system of claim 8, wherein the first extended attribute value is associated with an index node of the executable file of the application, wherein the first extended attribute value includes a directory path for the shared working directory.

11. The system of claim 8, wherein determining the first extended attribute value associated with the executable file of the application comprises determining the first extended attribute value in the kernel space after a system call is invoked.

12. A non-transitory machine-readable storage medium including instructions that, when executed by a processing device, cause the processing device to:
    receive, by a processing device, an chdir function invocation request from an application, wherein the application is executed in a user space;
    in response to receiving the chdir function invocation request, determine a shared working directory from a parameter of the chdir function invocation request, wherein the shared working directory is shared by the application and a parent process of the application;
    identify, in a kernel space, an extended attribute value associated with the shared working directory, wherein the extended attribute value comprises a first session identifier identifying a session comprising one or more processes; and
    determine, by comparing the first session identifier to a second session identifier associated with the application, whether the application has permission to use the shared working directory as a working directory.

13. The non-transitory machine-readable storage medium of claim 12, including instructions that, when executed by a processing device, cause the processing device to further: responsive to determining that the application has permission to use the shared working directory as a working directory, setting the shared working directory of a process running the application to be the shared working directory.

14. The non-transitory machine-readable storage medium of claim 12, including instructions that, when executed by a processing device, cause the processing device to further: responsive to determining that the application does not have permission to use the shared working directory as the working directory, notifying a user that the application does not have permission to use the shared working directory as the working directory.

15. The non-transitory machine-readable storage medium of claim 12, wherein the chdir function invocation request is a system call request for a service from a kernel of an operating system.

16. The non-transitory machine-readable storage medium of claim 12, wherein the extended attribute value indicates that the application has a permission to use the shared working directory as the working directory.

17. The non-transitory machine-readable storage medium of claim 12, wherein the extended attribute value indicates that the application is denied a permission to use the shared working directory as the working directory.

18. The non-transitory machine-readable storage medium of claim 12, wherein:
 the extended attribute value comprises one or more extended attribute values; and
 the one or more extended attribute values further include a security context that indicates a user, a role, or a type.

* * * * *